United States Patent
Krishnaswamy et al.

(10) Patent No.: US 9,599,765 B2
(45) Date of Patent: Mar. 21, 2017

(54) SYSTEM AND METHOD FOR DISPLAYING VISUAL NOTIFICATIONS ON AN ELECTRONIC DEVICE

(71) Applicant: BLACKBERRY LIMITED, Waterloo (CA)

(72) Inventors: Priyadarshini Krishnaswamy, Kitchener (CA); Antanas Matthew Broga, Cambridge (CA); Hsin Chin Lee, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 388 days.

(21) Appl. No.: 13/838,615

(22) Filed: Mar. 15, 2013

(65) Prior Publication Data
US 2014/0268629 A1    Sep. 18, 2014

(51) Int. Cl.
*G02B 6/00* (2006.01)
*F21V 8/00* (2006.01)

(52) U.S. Cl.
CPC ........... *G02B 6/0076* (2013.01); *G02B 6/006* (2013.01)

(58) Field of Classification Search
CPC ............................... G02B 6/0076; G02B 6/00
USPC ................................................... 362/600–634
See application file for complete search history.

(56) References Cited

U.S. PATENT DOCUMENTS

| | | | |
|---|---|---|---|
| 7,030,837 B1 | 4/2006 | Vong et al. | |
| 7,468,710 B2* | 12/2008 | Nakaoka | G09F 9/305 362/603 |
| 7,722,239 B2 | 5/2010 | Hsieh et al. | |
| 7,752,791 B2* | 7/2010 | Misawa et al. | 40/546 |
| 8,294,659 B2 | 10/2012 | Rosenblatt | |
| 8,300,778 B2 | 10/2012 | Shibuya et al. | |
| 2002/0155855 A1 | 10/2002 | Lee et al. | |
| 2009/0073721 A1* | 3/2009 | Kamikatano | F21V 7/05 362/616 |
| 2009/0227294 A1 | 9/2009 | Ouchi et al. | |
| 2009/0251920 A1* | 10/2009 | Kino et al. | 362/602 |
| 2010/0253221 A1* | 10/2010 | Chiang | 315/32 |
| 2012/0201048 A1* | 8/2012 | Prais | 362/602 |
| 2012/0311493 A1 | 12/2012 | Sohn | |
| 2013/0155723 A1* | 6/2013 | Coleman | 362/621 |

FOREIGN PATENT DOCUMENTS

| | | |
|---|---|---|
| EP | 1475731 A1 | 11/2004 |
| EP | 1758140 A1 | 2/2007 |
| FR | 2907295 A1 | 4/2008 |
| WO | WO 2005/015531 A1 | 2/2005 |

OTHER PUBLICATIONS

Pohl, M.; Search Report from corresponding European Application No. 13159368.3 ; search completed Aug. 9, 2013.
European Examination Report dated Aug. 17, 2016, received for European Application No. 13159368.3.

* cited by examiner

*Primary Examiner* — William Carter
(74) *Attorney, Agent, or Firm* — Jose Gutman; Fleit Gibbons Gutman Bongini & Bianco P.L.

(57) ABSTRACT

A light assembly for providing a notification light on an electronic device is described. The light assembly comprises a first light source for providing a background portion for the notification light, a second light source for providing a patterned portion for the notification light, and at least one pattern element to generate the pattern portion.

14 Claims, 16 Drawing Sheets

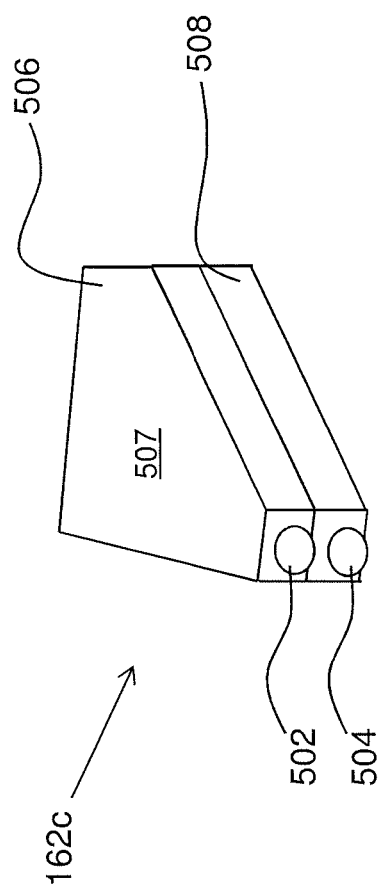
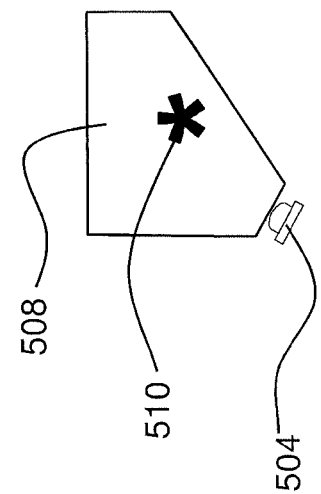
FIG. 9
FIG. 10
FIG. 11

SYSTEM AND METHOD FOR DISPLAYING VISUAL NOTIFICATIONS ON AN ELECTRONIC DEVICE

TECHNICAL FIELD

The following relates to systems and methods for displaying visual notifications on electronic devices.

DESCRIPTION OF THE RELATED ART

Electronic devices, particularly portable, handheld or other "mobile" electronic devices are routinely used for communicating and storing personal information such as calendar events, reminders, lists, photos, etc. Such electronic devices typically include the ability to provide notifications corresponding to the detection of particular events, e.g., upon receipt of a new communication. The notifications may include auditory alerts (e.g., tone, chime, tune, etc.), physical or tactile alerts (e.g., vibration), and visual alerts (e.g., flashing light of a particular color). The notifications may also include combinations of alerts, e.g., a flashing light in combination with a vibration or a tune.

Notification alerts on an electronic device are typically customizable and allow the user to associate specific light colors and/or audible alerts with different event types, contacts, urgency, etc. Since visual alerts are typically perceived to be less disruptive, visual alerts are often preferred over audible and physical alerts. With visual alerts, although different light colors may be used to signify different event types, the customization of visual alerts is often limited by the range of colors that can be emitted by the light being used, e.g., a multi-color light emitting diode (LED). Moreover, since such an LED includes a limited range of colors, several varieties of the same type of event (e.g., communications) may be lumped together making it difficult to determine if the event relates to an email, an instant message, a text message, etc.; without accessing and viewing application user interfaces on the device.

For example, it may be difficult to distinguish one color of a notification light from another when in bright sunlight. It may also be difficult to distinguish one rate of blinking from another without careful examination of the visual indication. As such, it may be unclear which has triggered the visual alert requiring additional steps to be taken to determine if the visual alert relates to something urgent or not, thus limiting the advantage of having the visual alert. Moreover, uncertainty regarding to what a notification light relates may cause important or urgent communications to be missed. For example, if a user mistakenly believes that a notification light for a telephone call relates to a text message, the user may not take immediate action to answer, and a phone call may be missed. Similarly, a calendar event reminder notification, an urgent email, or a communication from a particular contact could also be missed in this way.

BRIEF DESCRIPTION OF THE DRAWINGS

Embodiments will now be described by way of example only with reference to the appended drawings wherein:

FIG. 9 is a perspective view of an example of a side emitting light assembly;

FIG. 10 is a plan view of a background waveguide of the light assembly of FIG. 9;

FIG. 11 is a plan view of a pattern waveguide of the light assembly of FIG. 9;

DETAILED DESCRIPTION

Figure 1:
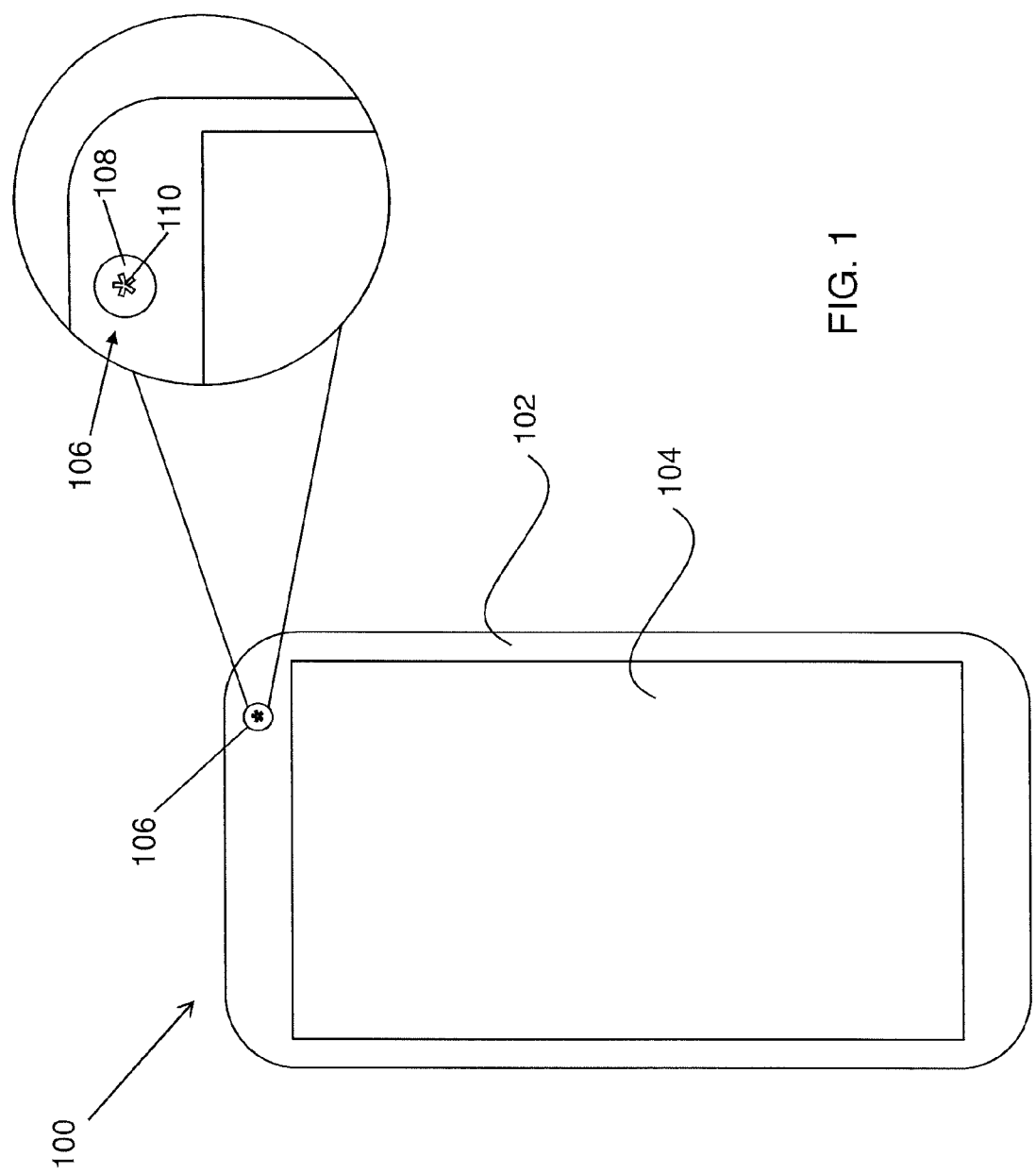
FIG. 1 is an illustrative view of a mobile electronic device having a notification light.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that while examples described herein may be described in relation to portable, handheld or otherwise "mobile" electronic devices, the principles discussed herein may equally apply to other types of electronic devices, such as laptop computers and other devices utilizing a visual notification or other visual alert.

It has been recognized that a notification light can be enhanced by using separate light sources to provide both a patterned portion and a background portion. For example, an icon or other indicia can be used to distinguish one alert of a particular color from another alert using the same color. The patterned portion can be created by using waveguides and a pattern element that visually distinguishes the light source for the patterned portion from the light source for the background portion. In this way, the background portion can create a background color for a distinguishable pattern. The patterned portion can also be created using organic light emitting diode layers that are selectively activated to illuminate the background portion using one layer and illuminate a pattern element on another layer.

In one aspect, there is provided a light assembly for providing a notification light on an electronic device, the light assembly comprising: a first light source for providing a background portion for the notification light; a second light source for providing a patterned portion for the notification light; and at least one pattern element to the pattern.

The light assembly may further comprise a light controller for selectively operating the first light source and the second light source.

The light assembly may also be configured such that the first and second light sources are provided by light emitting diodes and corresponding waveguides to direct light through the light assembly, wherein the pattern element is provided in an interface between the corresponding waveguides to restrict light from the second light source in generating the patterned portion.

The interface between the corresponding waveguides may be integrated with one of the waveguides or be a distinct layer or element providing a mask.

The first and second light sources may both be side emitting light emitting diodes. Alternatively, the first light source may be a side emitting light emitting diode and the second light source may be a front emitting light emitting diode.

The light assembly may also include an optical diffuser to direct light from the second light source.

The first and second light sources may be provided by light emitting diodes directing light through a single waveguide, the first light source being a side emitting light emitting diode and the second light source being a front emitting light emitting diode.

The single waveguide may comprise a convex portion aligned with the second light source, or may comprise a concave portion aligned with the second light source.

The second light source may be aligned with the pattern element such that the pattern element restricts light from the second light source to generate the patterned portion of the notification light.

The light assembly may include a plurality of pattern elements on respective organic light emitting diode layers, wherein the second light source selectively illuminates at least one of the plurality of pattern elements to provide the patterned portion of the notification light.

A plurality of pattern elements may be provided on respective organic light emitting diode layers.

The first light source may be provided by at least one background organic light emitting diode layer located beneath the plurality of respective organic light emitting diode layers for the plurality of pattern elements.

The light assembly may include one or more waveguides, each waveguide having a particular shape, the particular shape may be circular, square, chamfered circular, or pentagonal.

The light assembly may provide at least one of the light sources using a base or substrate that supports one or more light emitting diodes.

In another aspect, there is provided a method of providing a notification light on an electronic device, the method comprising: activating a first light source to provide a background portion of the notification light; and activating a second light source to provide a patterned portion of the notification light using a pattern element.

The method may further comprise determining a notification type, determining a corresponding combination of patterned portion and background portion, and operating the first and second light sources according to the corresponding combination.

The method may also comprise operating the first and second light sources to provide particular ones of a plurality of colors.

The method may be performed by a light controller. The light controller may be configured to receive notification events from a notification controller associated with an application and/or a low level detector associated with a battery.

Turning now to FIG. 1, a mobile electronic communication device, hereinafter a "mobile device" 100 is shown. The mobile device 100 includes a housing 102 and a display 104. The mobile device 100 may also have a physical keyboard (not shown in this example) or a virtual keyboard rendered on the display 104. The mobile device 100 also includes a notification light 106 visible through or otherwise supported by the housing 102. As shown in the partial enlarged portion in FIG. 1, the notification light 106 includes both a background portion 108 and a patterned portion 110. The background portion 108 and patterned portion 110 are generated by respective light sources and are visually distinguishable from each other such that, for example, the presence and color of the background portion 108 can be distinguished from the shape and color of the patterned portion 110 when corresponding lights are emitted at the same time. It can be appreciated that the mobile device 100 may include various other components, which have been omitted from FIG. 1 for the sake of brevity. It can be appreciated that the position of the notification light 106 on the housing 102 as shown in FIG. 1 is for illustrative purposes only and other positions may be used. Moreover, it can also be appreciated that multiple notification lights 106 may be used.

Figure 2:
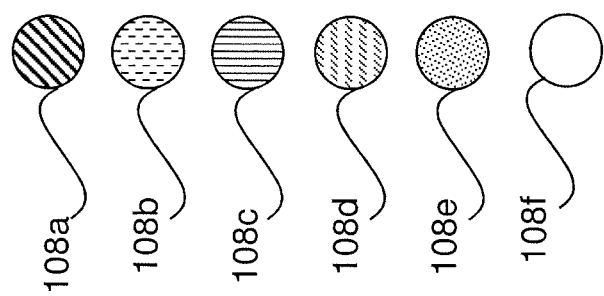
FIG. 2 is a schematic view of a series of notification background light types.

FIG. 2 illustrates a series of different background portions 108a, 108b, 108c, 108d, and 108e. Each background portion 108a-e in FIG. 2 includes a different pattern, each representing a different color for the purpose of the present illustration. FIG. 2 also illustrates that the same background portion 108 may be used to provide different notification types by varying the emitted color. For example, the background portions 108 may be provided using light emitting diodes (LEDs) capable of displaying a plurality of colors such as white, red, blue, green, and yellow. Each color may be associated with a different type of notification. In order to provide additional context and/or to distinguish between different event types using the same background portion 108, one or more patterned portions 110a, 110b, 110c, may be used, as shown by way of example in FIG. 3.

Figure 3:
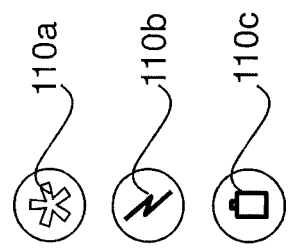
FIG. 3 is a schematic view of a series of notification graphic pattern types.

In FIG. 3, various pattern portions 110a, 110b, 110c to illustrate that in addition to varying the background portion 108, a pattern 110 may be superimposed or otherwise combined with the color of the background portion 108 to provide additional context. In the examples described below, a single patterned portion 110 may be individually controlled using a separate corresponding light source. Multiple patterned portions 110 may also be provided in various combinations with multiple background portions 108 using multiple transparent layered organic light emitting diodes (OLEDs).

Figure 4:
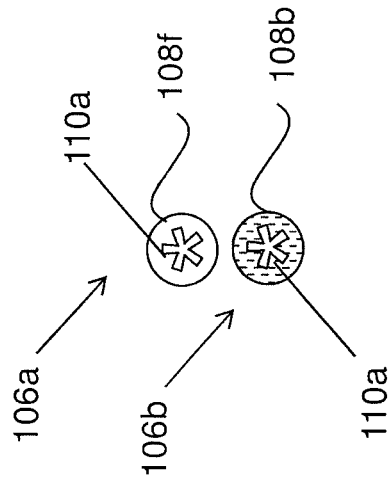
FIG. 4 is a schematic view of a same notification graphic pattern with varied background light types.

FIG. 4 illustrates an example wherein multiple background portions 108f, 108b are used in providing a first notification light 106a and a second notification light 106b in different scenarios. The same patterned portion 110a is emitted in both scenarios and the background color provided by the corresponding background portion 108f, 108b is used to provide additional context. For example, the first notification light 106a may provide a red background portion 108f with a white asterisk patterned portion 110a to provide a new instant message notification. In another example, the first notification light 106a may provide a green background portion with a white lightning bolt patterned portion 110b to indicate that the mobile device 100 is being charged. The second notification light 106b may provide a different color in the background portion 108b to indicate both a new instant message (using the asterisk patterned portion 110a) and a low battery notification. By providing various combinations of colors and patterns in this way enables an enhanced and contextual notification to be provided. For example, if the notification indicates that the battery is low but a new instant message has arrived, the user may decide to first plug in their device to begin charging before viewing the new message. It can be appreciated that the different colors emitted by the background portion 108 can be achieved in different ways. For example, multiple LEDs having corresponding colors can be arranged to be individually controlled, or a single LED can be controlled to emit different colors by emitting light at multiple different wavelengths.

Figure 5:
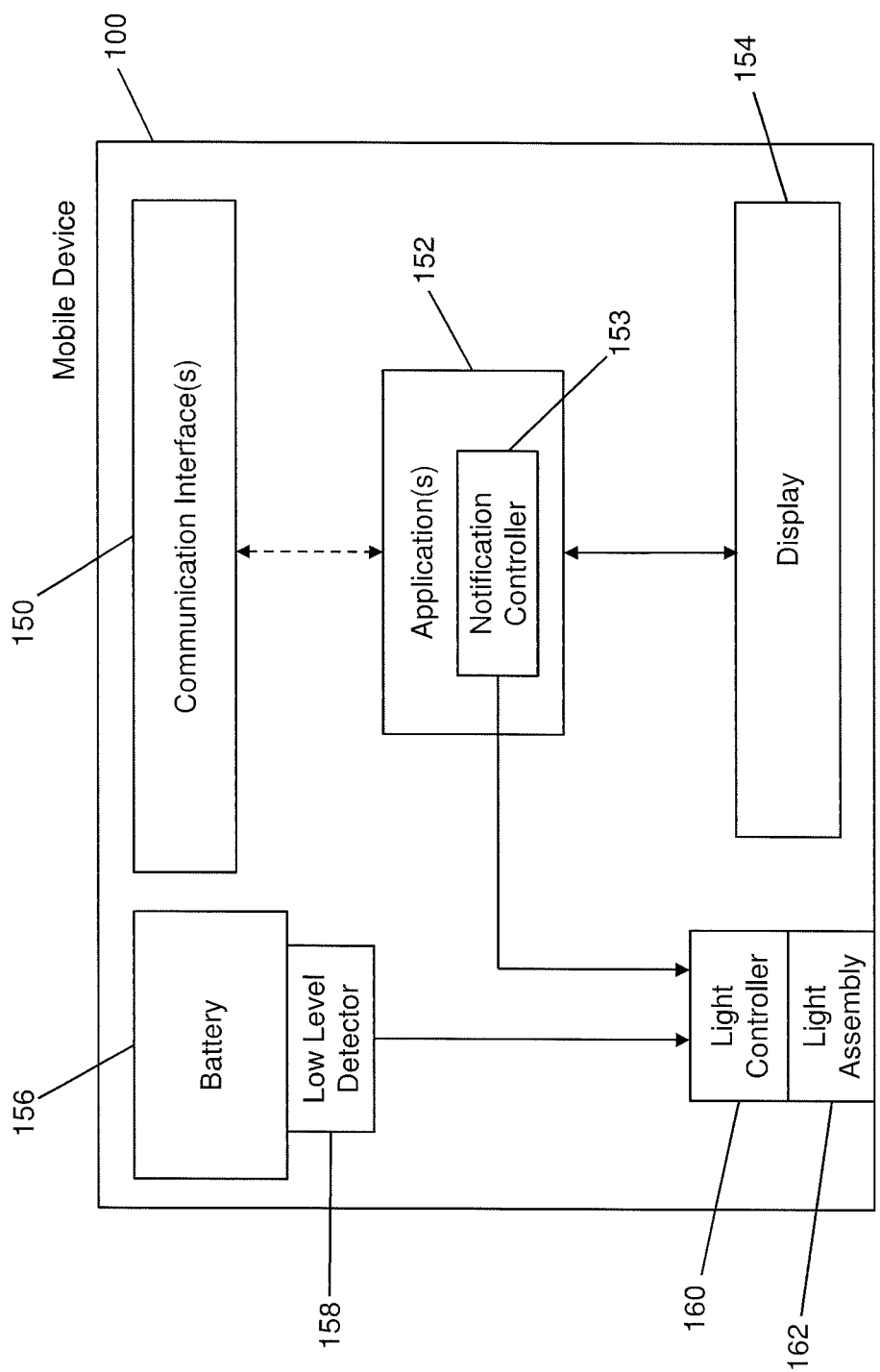
FIG. 5 is a block diagram illustrating an example of a configuration for an electronic device.

FIG. 5 illustrates an example of a block diagram for a mobile device 100. The mobile device 100 includes one or more communication interfaces 150 that enable the mobile device 100 to communicate with networks or other devices. It can be appreciated that the communication interfaces 150 may include wired, wireless, short-range or local, and long-range or wide area communication and/or access technologies, e.g., cellular, Wi-Fi, Bluetooth, near field communication (NFC), high definition multimedia interface (HDMI), universal serial bus (USB), etc. The mobile device 100 in this example includes at least one application 152 that may or may not utilize a communication interface 150. For example, a messaging-type communication 152 may utilize a communication interface 152 to send and receive messages whereas a reminder application 152 may operate locally without the need to access a network or communicate with another device. As shown in FIG. 5, the applications 152 may also be configured to render user interface elements on a display 154.

The application 152 in the example shown in FIG. 5 includes a notification controller 153 for detecting notification events associated with the corresponding application 152. For example, the notification controller 153 for an instant messaging application 152 may be configured to detect incoming messages, incoming invitations, group calendar events, etc. The mobile device 100 includes a battery 156 for powering the various components thereof. The battery 156 in this example includes or otherwise interfaces with a low level detector 158 for determining if the battery level of the battery 156 drops below a predetermined threshold. The notification controller 153 and low level detector 158 are configured to trigger a particular notification by alerting a light controller 160 of the detected event. The light controller 160 is incorporated into or otherwise interfaced with a light assembly 162. The light assembly 162 includes or otherwise controls the externally visible notification light 106 shown in FIG. 1. For example, the light assembly 162 may include one or more waveguides and LEDs that operate to provide various visual notification types by varying the background portion 108 and/or patterned portion 110 visible at the housing 102. Several example configurations for the light assembly 162 are described below.

Figure 6:
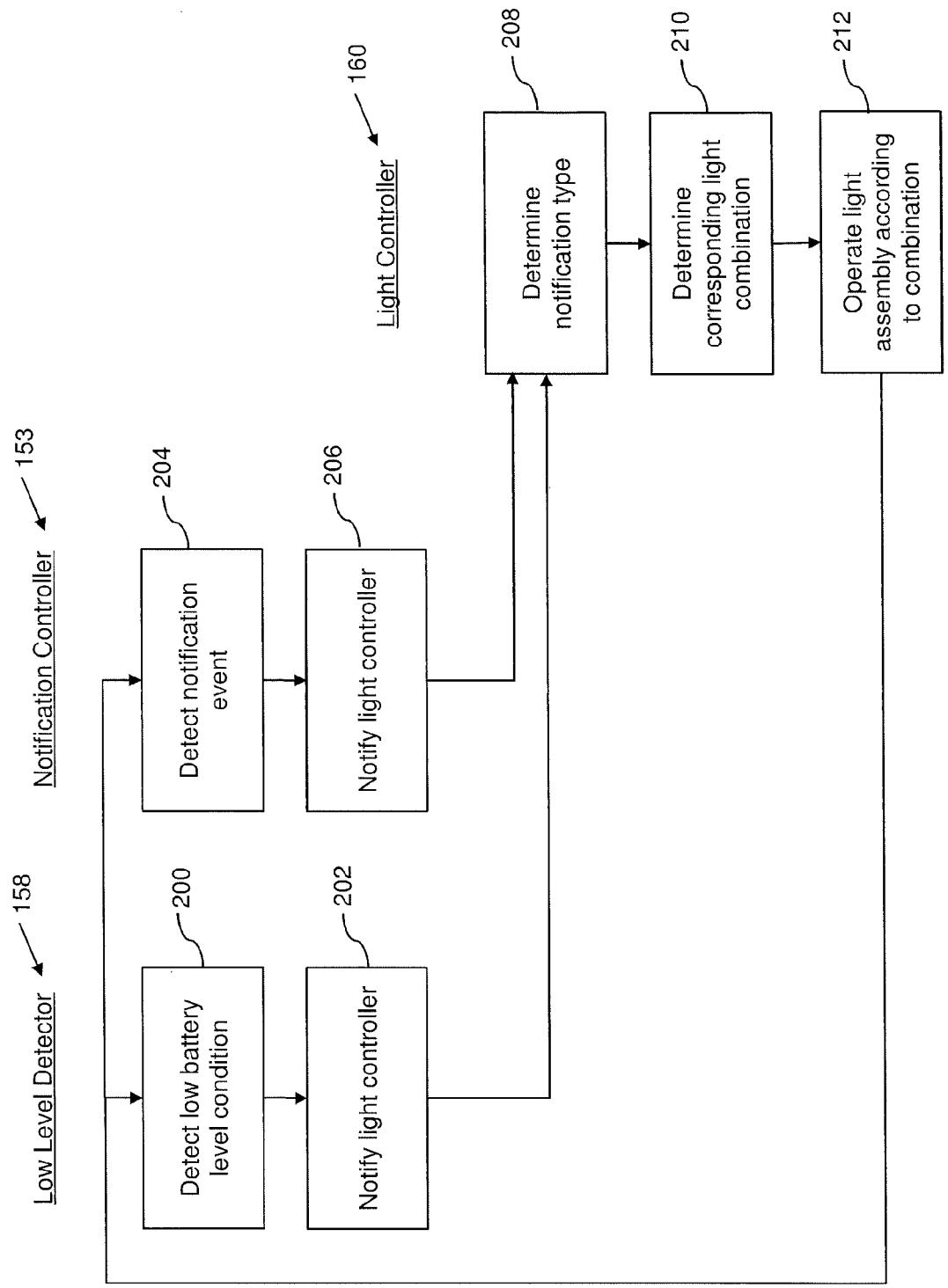
FIG. 6 is a flow chart illustrating an example of a set of computer executable operations that may be performed in controlling a light assembly on an electronic device for outputting visual notifications.

The light controller 160 may operate as illustrated in FIG. 6 to provide visual notifications corresponding to detected event types. At 200 the low level detector 158 detects a low battery level condition (e.g., by checking the battery level and comparing the current level to a predetermined threshold) and notifies the light controller 160 of a low battery event at 202. The notification controller 153 may similarly detect a notification event for an application 152 at 204 and notify the light controller 160 of a particular message event type at 206. It can be appreciated that any one or more events and event types may be detected as illustrated in FIG. 6 and the examples shown (for the low level detector 158 and notification controller 153) are for illustrative purposes only. The light controller 160 determines a notification type at 208 according to the one or more events of which it has been notified. The light controller 160 determines a corresponding light combination for the light assembly 162 based on the notification type at 210, and operates the light assembly according to the combination at 212.

Figure 7:
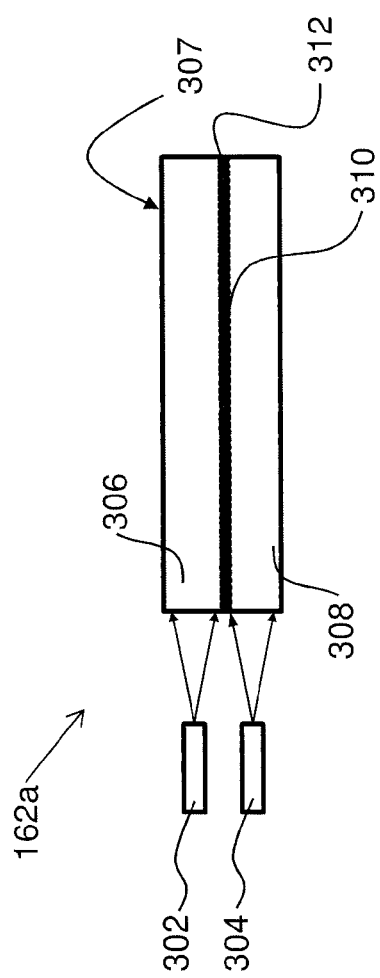
FIG. 7 is an elevation view of a schematic diagram of a side emitting light assembly.

FIG. 7, illustrates an elevation view of an example of a light assembly 162a that includes a side emitting configuration. The light assembly 162a includes an upper side-emitting LED 302, which emits light into a background waveguide 306; and a lower side-emitting LED 304, which emits light into a pattern waveguide 308. The upper LED 302 and background waveguide 306 provide the background portion 108 of the notification light 106 visible on an upper surface 307 of the background waveguide 306. The lower LED 304 and pattern waveguide 308 are used to provide the patterned portion 110 of the notification light 106 on the upper surface 307. The background waveguide 306 receives light from the upper LED 302 and emits light substantially uniformly over the upper surface 307.

The lower LED 304 emits light into the pattern waveguide 308 substantially perpendicular to the direction of light ultimately emitted from the patterned portion 110. An interface 312 between the background waveguide 306 and the pattern waveguide 308 includes a pattern element 310, which allows light that conforms to a predetermined pattern to be emitted from the pattern waveguide 308 and upwardly through the background waveguide 306 to the upper surface 307. The background and pattern waveguides 306, 308 may guide light using internal reflection or refraction principles. The configuration shown in FIG. 7 therefore enables, for example, a red upper side-emitting LED 302 to provide a red background portion 108 for the notification light 106, and a white lower side-emitting LED 304 to provide an asterisk patterned portion 110. In this way, the notification light 106 provides a white asterisk with a red background, e.g., to indicate that a new instant message has been received.

Although reference is made to an upper LED 302 and a lower LED 304, it will be appreciated that a plurality of upper LEDs 302 and a plurality of lower LEDs 304 may be used. For example, the light assembly 162 may include three LEDs including a red LED, a blue LED, and a green LED such that various other color combinations may be achieved. Alternatively, either or both of the upper LED 302 and the lower LED 304 may be configured as multicolor LEDs. It has also been recognized that in order to provide a highly visible patterned portion 110 relative to the background portion 108, the lower LED 304 emits light at a relatively higher intensity than the upper LED 302 to generate a patterned portion 110 that is visually distinguishable from the background portion 108 of the notification light 106 in operation.

Figure 8:
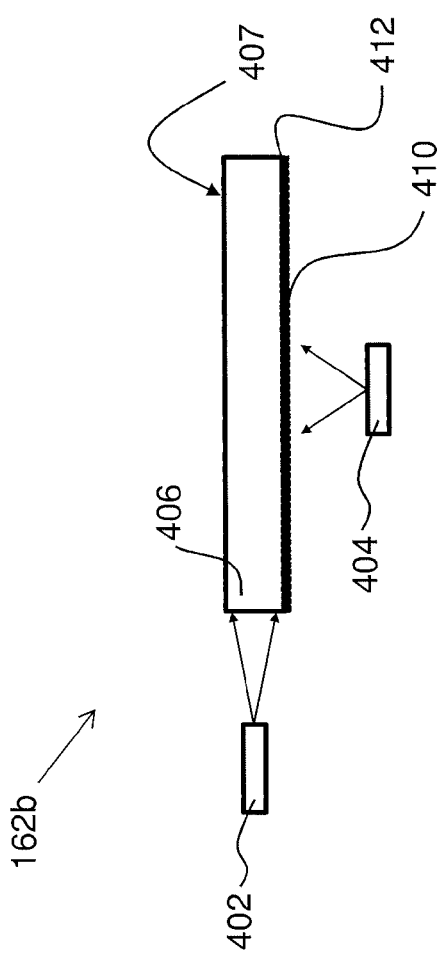
FIG. 8 is an elevation view of a schematic diagram of a side and back emitting light assembly.

FIG. 8 illustrates an elevation view of an example of a light assembly 162b that includes a back emitting configuration. A side-emitting LED 402 emits light into a background waveguide 406 and a front-emitting LED 404 emits light into a pattern waveguide 408. However, when compared to the configuration shown in FIG. 7, the front-emitting LED 404 in FIG. 8 emits light from the underside or "back side" of the light assembly 162b. Accordingly, the light being emitted by the front emitting LED 404 travels substantially parallel to exit through a pattern element 410 and thus be visible on an upper surface 407 of the background waveguide 406. The patterned element 410 at the interface 412 between the background waveguide 406 and the front-emitting LED 404 allows light conforming to a predetermined pattern to reach the upper surface 407, similar to the configuration shown in FIG. 7.

FIG. 9 illustrates an example of a light assembly 162c that includes a back emitting configuration and pentagon-shaped background and pattern waveguides 506, 508, the background waveguide 506 having an upper surface 507 on which the notification light 106 appears. FIG. 10 is an example overhead view of the background layer of a side emitting notification light 300 such as that of FIG. 3. An upper LED 502 provides light to a background waveguide 506, and light escapes the background waveguide 506 substantially perpendicular to the input direction of light to appear on the upper surface 507 of the background waveguide 506, thereby causing a substantially uniform distribution of light at the background wavelength. As shown in FIG. 11, a lower LED 504 emits light into a pattern waveguide 508, and a patterned portion 510 of the waveguide 508 corresponding to the patterned portion 110 of the notification light 106 is emitted by the pattern waveguide 508 through the background wave guide 506.

Figure 12:
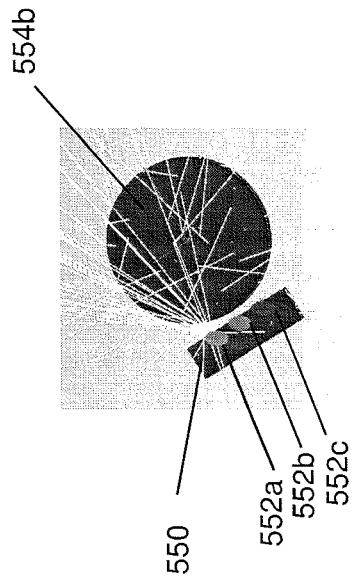
FIG. 12 is a perspective view of a square waveguide.
Figure 13:
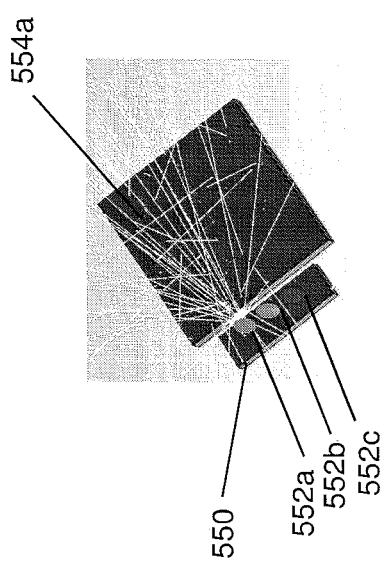
FIG. 13 is a perspective view of a circular waveguide.
Figure 15:
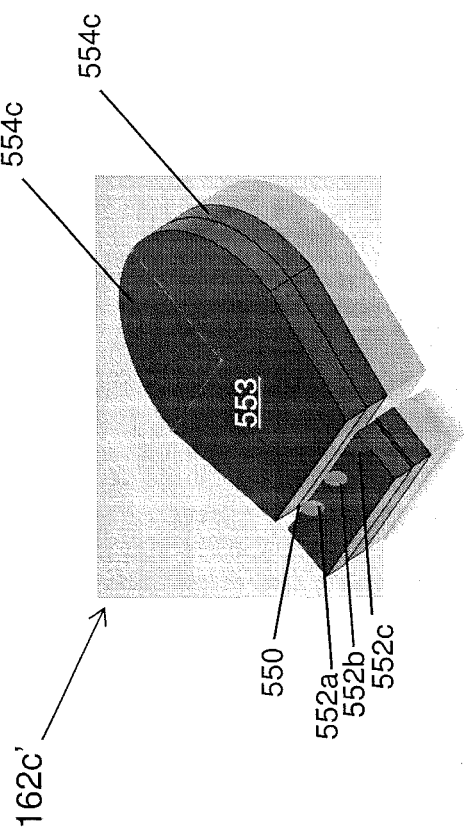
FIG. 15 is a perspective view of a chamfered circular-shaped light assembly with a side emitting LED.
Figure 14:
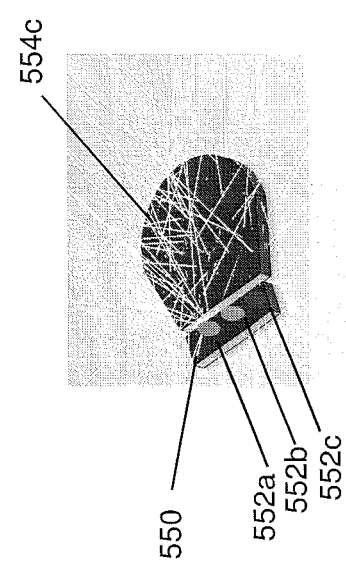
FIG. 14 is a perspective view of a chamfered circular waveguide.
Figure 16:
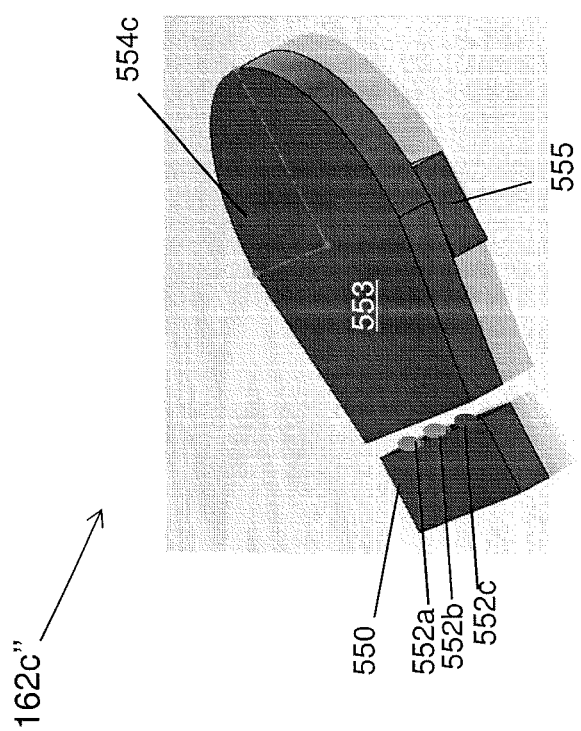
FIG. 16 is a perspective view of a chamfered circular shaped light guide assembly with a side emitting and a front emitting LED.

The shape of the waveguides described herein may be chosen based on the shape of the area to be illuminated in order to improve efficiency. For example, as shown in FIGS. 12 to 14, an LED base 550 having a green LED chip 552a, blue LED chip 552b, and red LED chip 552c may be arranged in a line along the LED base 550. Consequently, the shape of the waveguide should be chosen to not only gather light from a central one of the LEDs 552b, but also the end LEDs 552a, 552c. A square-shaped waveguide 554a is shown in FIG. 12, a circular waveguide 554b is shown in FIG. 13, and a chamfered circular waveguide 554c is shown in FIGS. 14, 15, and 16. As illustrated in FIGS. 12-14, the circular waveguide 554b in this example has a relatively higher light loss from the edge LEDs 552a, 552c, whereas the square waveguide 554a is relatively more efficient for gathering light from the edge LEDs 552a, 552c. The chamfered circular waveguide 554c shown in FIGS. 14 and 15 and example light assemblies 162c', 162c" shown in FIGS. 15 and 16 having an upper surface 553 on which the notification light 106 appears, balance the benefits of the square and circular shapes to improve efficiency. However, it may be noted that for relatively thin waveguides, the variations in efficiency may be minimal since the light would be well contained within the waveguide. As shown in FIG. 16, a light assembly 162c" having a single chamfered circular waveguide 554c with an upper surface 553 can be created by incorporating a front-emitting LED background 555.

It can be appreciated that in another example, a pattern element or mask could be created to prevent light from being emitted through a single waveguide in a patterned portion while permitting light to be emitted around the pattern. In this way, every notification created using an LED emitting light through the single waveguide would include the pattern. Such an example configuration may be desirable in scenarios where space is limited but a stylized or otherwise branded or distinct notification pattern is desired. It can also be appreciated that such a mask could also be used in a configuration having two waveguides, in order to have the color of the lower LED 304 and front-emitting LEDs 404, 504 applied to the background portion 108 as seen through the housing 102 and the upper LED 302s, 402, 502 applied to the pattern portion 110 as seen through the housing 102. In this way, the overall effect is similar to that produced using the configurations shown in FIGS. 7-11 using opposite waveguides to create the patterned effect.

Figure 17:
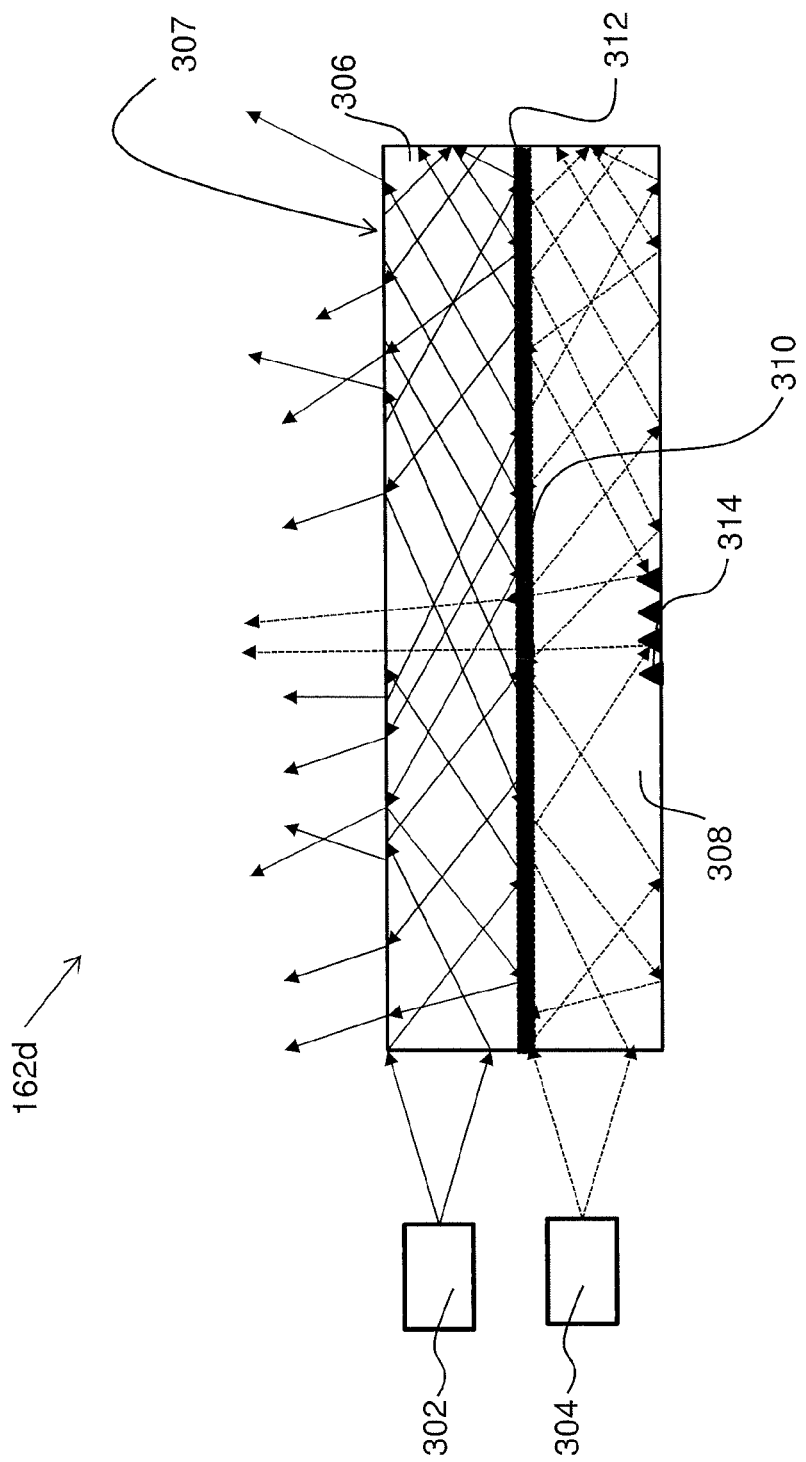
FIG. 17 is a plan view of a side emitting light assembly having an interfacial pattern element.

Referring now to FIG. 17, an elevation view of a light assembly 162d similar to that shown in FIG. 7 is provided with ray traces included to illustrate operation of the light assembly 162d to emit light in an upward direction such that the notification light 106 appears on the upper surface 307 of the background waveguide 306. The pattern element 310 is the only location at the interface 312 that permits light from the lower LED 304 to be emitted by the pattern waveguide 308 and through the background waveguide 306 to provide the notification light 106 on the upper surface 307. The pattern element 310 may comprise a transparent portion of an otherwise light blocking or opaque or reflective interface 312. Alternatively, the pattern element 310 may be a transparent portion of an optical mask formed in a mask layer at the interface 312 of the background waveguide 306 and the pattern waveguide 308. The pattern waveguide 308 may also include an optical diffuser 314, which diffuses laterally incident light to cause a greater amount of light to reach the pattern element 310. As is shown in FIG. 17, the diffuser is located substantially in the same region as the pattern element 310 and is substantially aligned with the pattern element 310.

Figure 18:
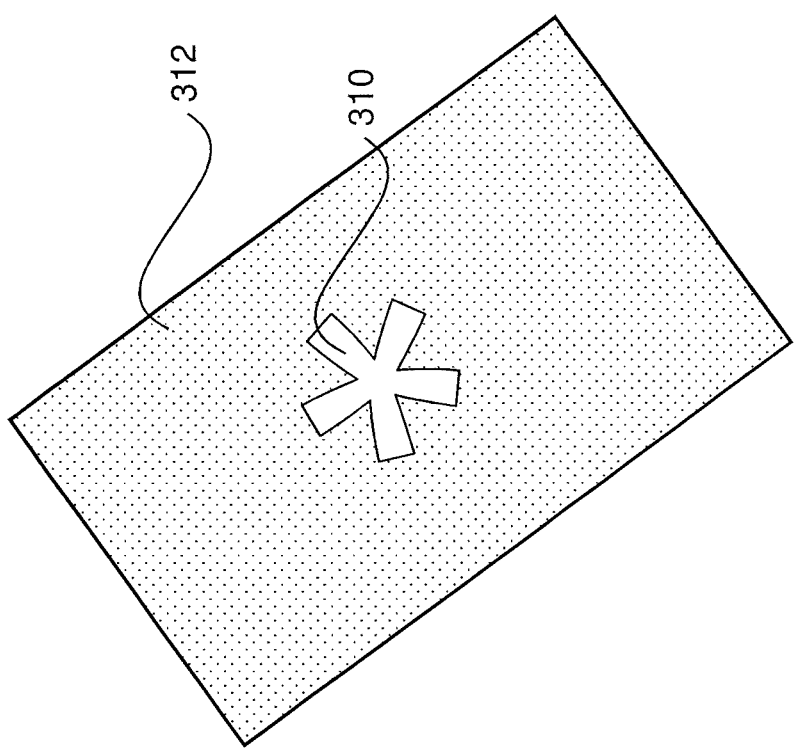
FIG. 18 is a schematic diagram of an example pattern element on an interfacial filter.

FIG. 18 provides an enlarged view of the interface 312 in isolation with a pattern element 310 therein. The interface 312 may comprise a distinct layer or may be formed integrally with the pattern waveguide 308 or background waveguide 306. The interface 312 may comprise a light reflecting material or a light absorbing material to prevent light from escaping through undesired portions of the notification light, which could prevent the light from the patterned portion 110 interfering with the background portion 108. A light reflecting material has the advantage that light reflected at the interface 312 provides a higher efficiency towards the background waveguide 306 and the pattern element 310 shown in FIG. 7, to thereby increase the efficiency of the background portion 108 and pattern portion 110. In the configuration shown in FIG. 8, the light reflecting material also improves light illuminating the background portion 108.

Figure 19:
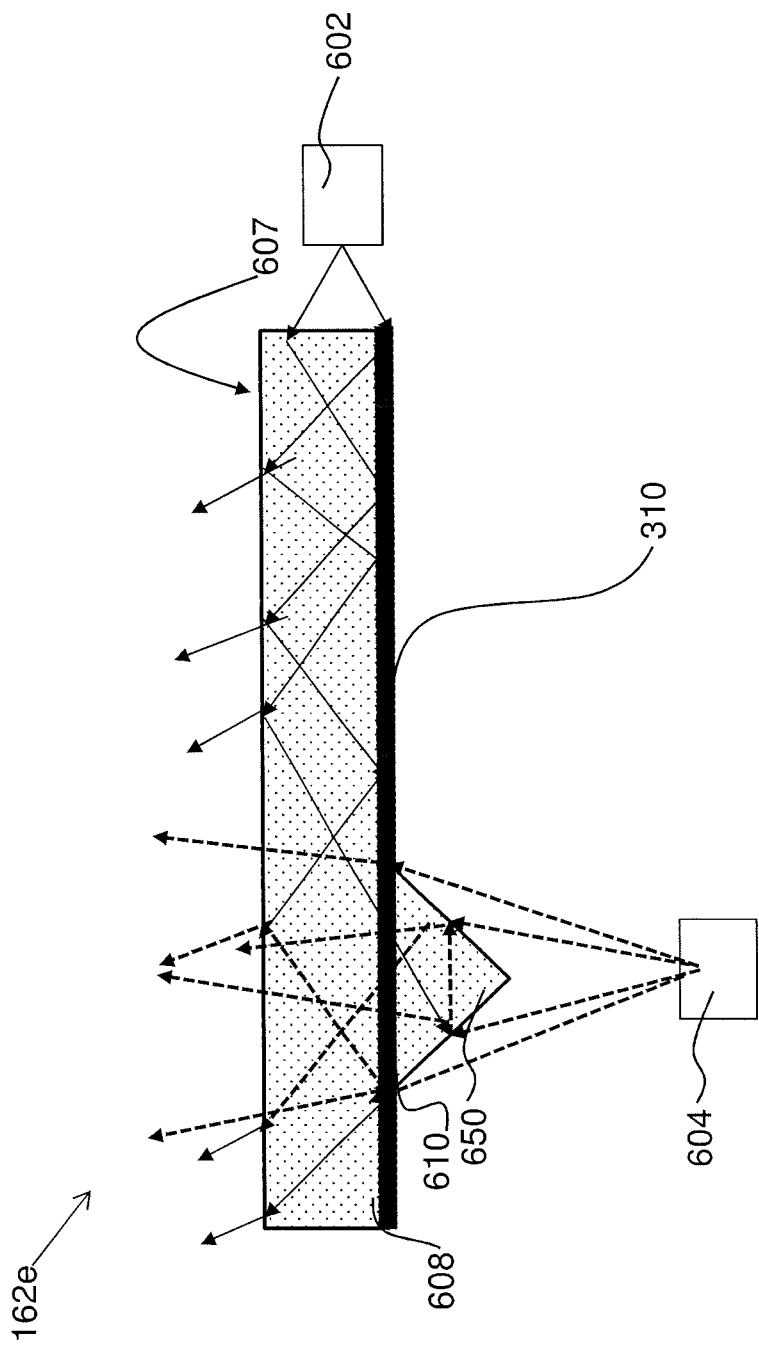
FIG. 19 is an elevation view of a back emitting light assembly having a focusing waveguide.

In some applications, it may be desirable to direct the patterned light substantially directly through the surface of the light assembly 106. FIG. 19 illustrates an example of an elevation view of a light assembly 162e configured to provide a substantially directed patterned portion 110. As shown in FIG. 19, a front-emitting LED 604 can be located behind a background waveguide 608 with a side-emitting LED 602 located substantially on the side of the background waveguide 608. A pattern waveguide 650 aligned with the background waveguide 808 and having a substantially convex structure directs light perpendicular to an upper surface 607 of the background waveguide 608 such that the light from the side-emitting LED 604 is viewed on the upper surface 607 most brightly when viewed from a substantially normal direction to the surface. It can be appreciated that a pattern element 310 may be provided on the interface between the background waveguide 608 and the pattern waveguide 650 shown in FIG. 19. In this configuration, a pattern element 310 may not be required for selective patterns and the pattern waveguide 650 relied upon to controllably direct light through a portion of the background waveguide 608. In such a configuration, a front-emitting LED 604 having a narrow or "tight" beam could be used.

Figure 20:
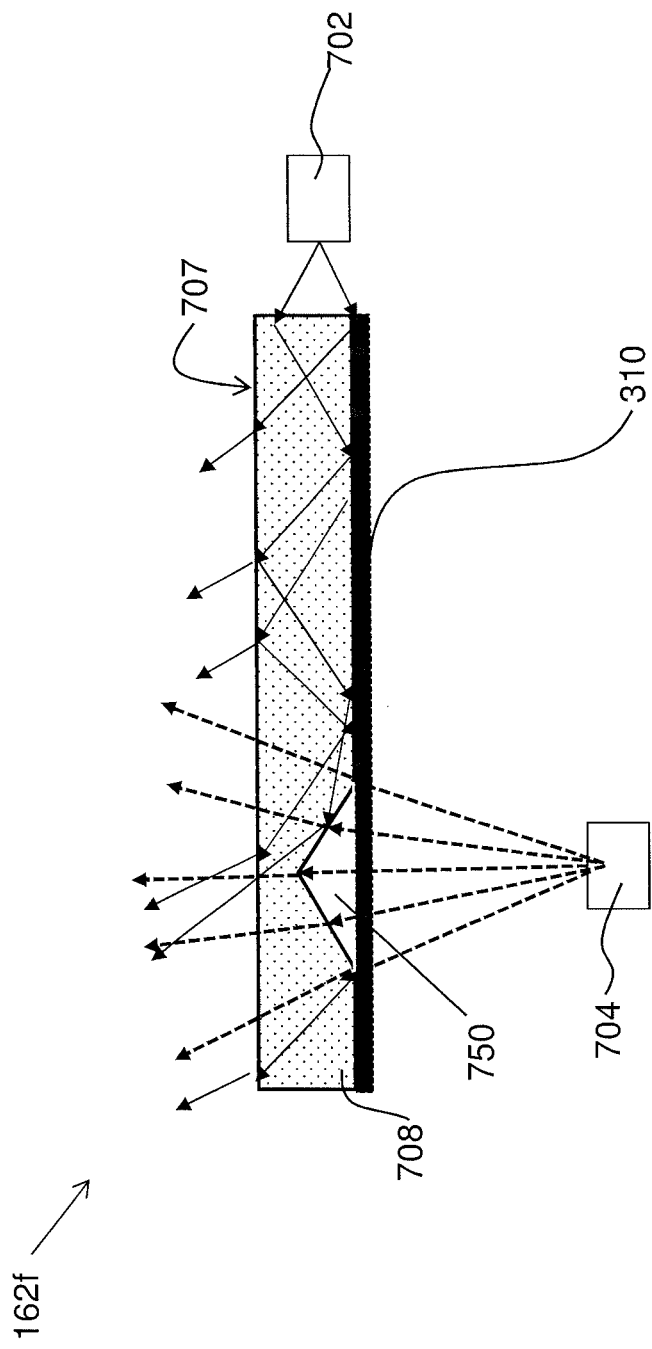
FIG. 20 is an elevation view of a back emitting light assembly having a distributing waveguide.

In other applications, it may be advantageous to direct substantially diffuse light from the surface of the light assembly 162 such that the notification light 106 may be viewed equally from various angles. FIG. 20 illustrates an elevation view of a light assembly 162f in which a front-emitting LED 704 is located behind a background waveguide 708, and a side-emitting LED 702 located substantially on the side of the background waveguide 708. The front-emitting LED 704 emits into a concave portion 750 of the background waveguide 708 such that the concave portion 750 acts to diffuse the light incident from the front-emitting LED 404 that appears on an upper surface 707 of the background waveguide 708. In this way, the notification light 106 may be viewed on the upper surface 707 from various angles.

Figure 21:
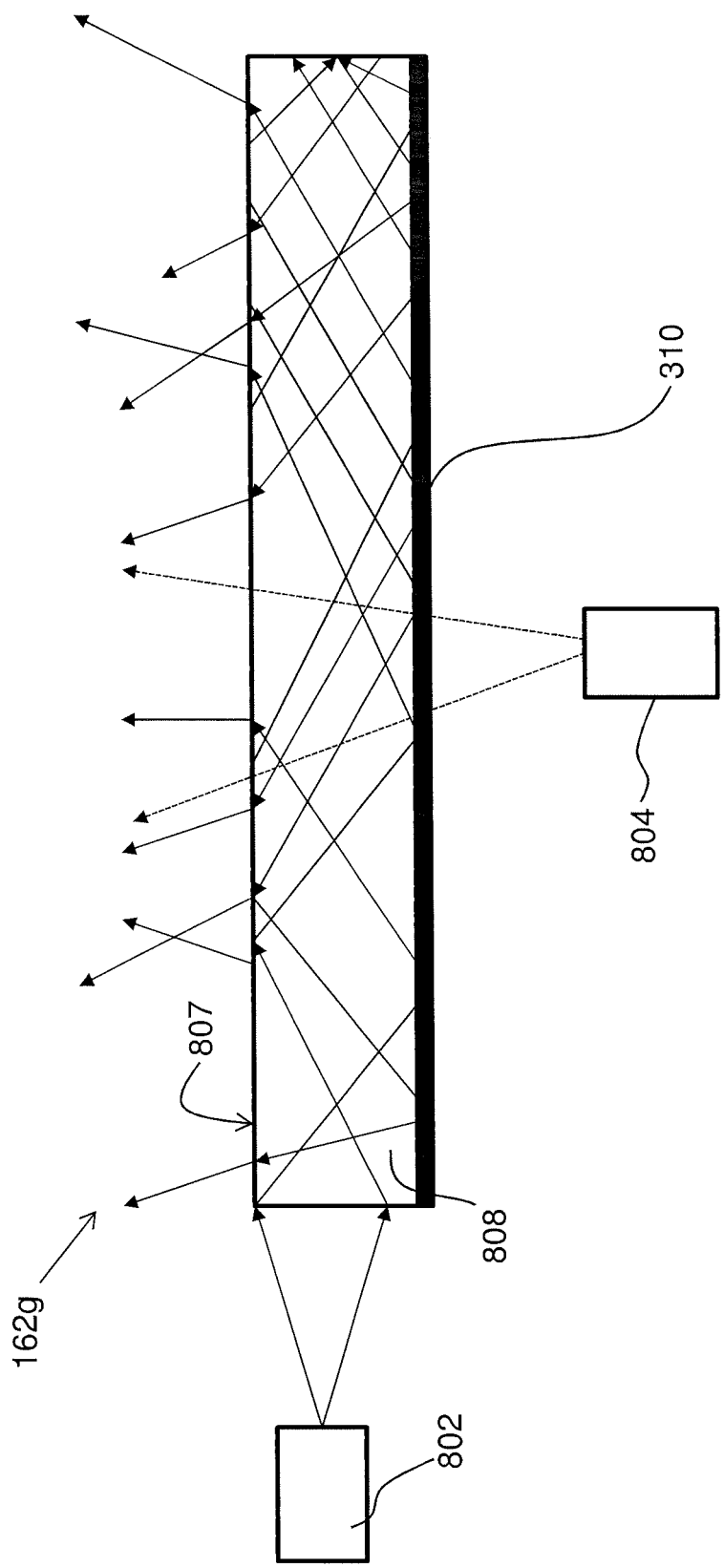
FIG. 21 is an elevation view of a back emitting light assembly having a waveguide and a pattern element.

FIG. 21 illustrates an elevation view of a light assembly 162g that also includes a configuration for producing a substantially diffuse light. The light assembly 162g shown in FIG. 21 includes a side-emitting LED 802 which emits light into a background waveguide 808 to provide the background portion 108 on an upper surface 807 of the background waveguide 808. A front-emitting LED 804 is located behind the background waveguide 808 and emits light into a region of the background waveguide 808. The pattern element 310 passes light optimally from the LED 804 to produce the desired pattern on the upper surface 807. In this configuration, the front-emitting LED 804 is used directly to create the patterned portion 110 of the notification light 106.

Figure 22:
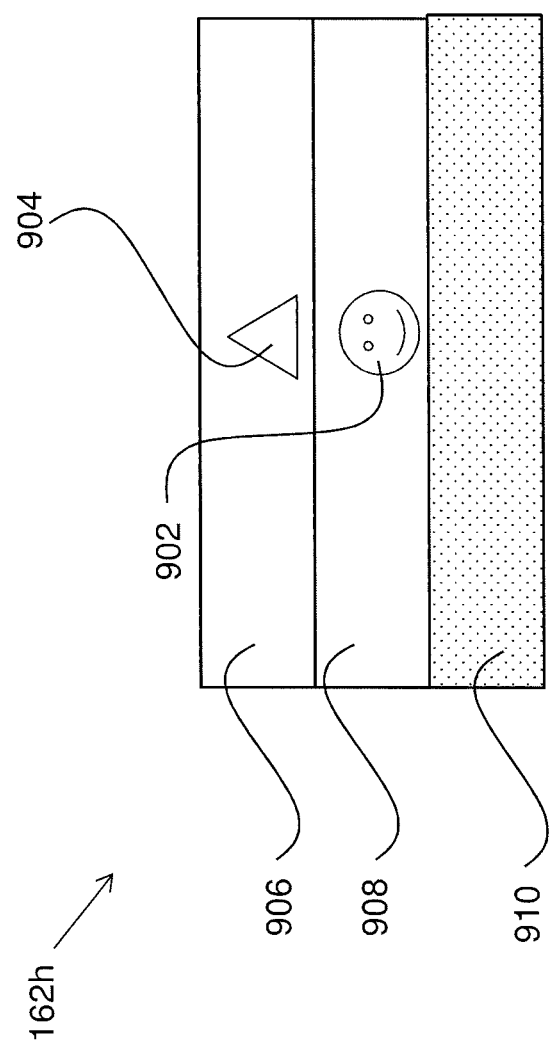
FIG. 22 is a schematic illustration of a light assembly utilizing a layered organic light emitting diode.

As discussed above, layered OLED technology can be used to not only provide a plurality of colors, but also a plurality of patterns for a notification light 106. Turning now to FIG. 22, an example of a light assembly 162h is shown, which can emit a plurality of patterns. The notification light 1602h includes a plurality of OLED layers stacked upon each other, including a background OLED layer 910, a first pattern OLED layer 908 comprising a first light emitting pattern area 902, and a second pattern OLED layer 906 comprising a second light emitting pattern area 904. The first and second pattern OLED layers 908 and 906 only emit light at the first and second light emitting pattern areas 902 and 904, respectively. It will be appreciated that the first and second light emitting pattern areas 902 and 904 shown in FIG. 22 are illustrative only. The first and second light emitting pattern areas 902 and 904 are oriented such that they emit light substantially perpendicular to interfaces between the layers of the light assembly 162h.

In the configuration shown in FIG. 22, the anode and cathode of at least the pattern OLED layers 908, 906 are substantially transparent to enable light generated in the background OLED layer 910 to be emitted through each of the first and second pattern OLED layers 908, 906.

The light assembly 106h may emit light from the first pattern area 902 by illuminating only the first pattern OLED layer 908 and the background OLED 910. Alternatively, the second pattern OLED layer 904 may be illuminated with only the background OLED 910 to produce the second pattern. It will be appreciated that both the first pattern area 902 and the second pattern area 904 may be emitted simultaneously by driving both the first and second pattern OLED layers 908, 906 simultaneously to produce a pattern comprising a composite of the first and second light emitting pattern areas 902 and 904. For example, as shown in FIG. 22, the first pattern area 902 corresponds to a "smiley face" and the second pattern area 904 corresponds to a triangle. Using these two patterns, when lit simultaneously, a smiley face can be seen within a triangle.

Figure 23:
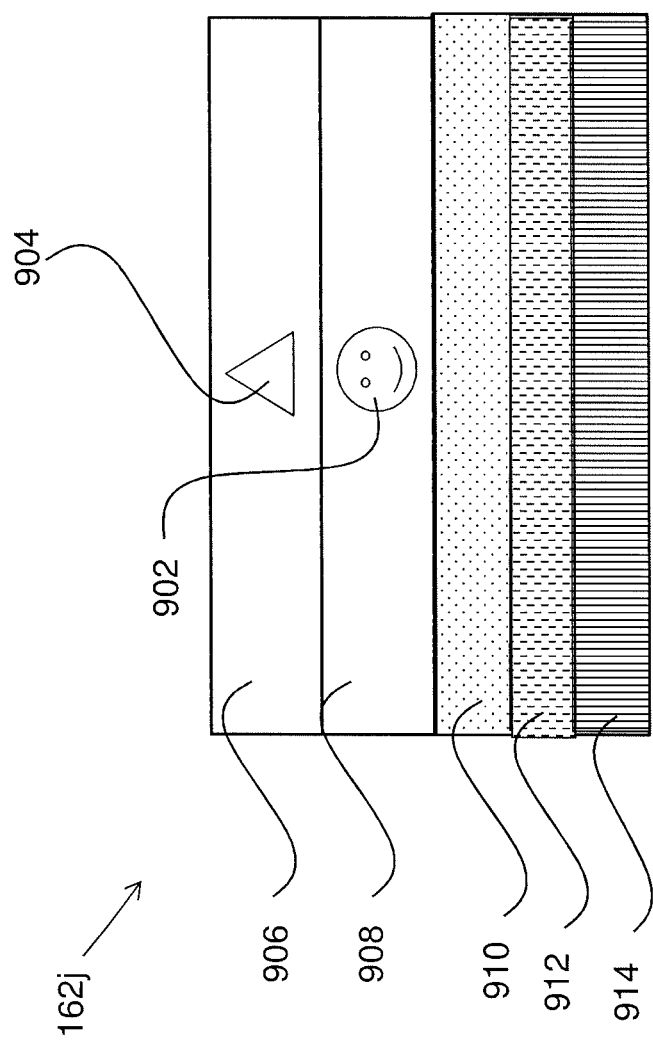
FIG. 23 is a schematic illustration of a multi-colored light assembly utilizing a layered organic light emitting diode.

As shown in FIG. 23 a light assembly 162j may also be configured using OLED layers in order to include both multiple patterns and multiple colors. The light assembly 162j in FIG. 23 is similar to that shown in FIG. 22 with two additional background layers 912, 914 below the background OLED layer 910. Each of the additional background layers 912, 914 enables the notification light 106 to emit at a particular wavelength. For example, the background OLED layer 912 may emit at a red wavelength, the background OLED layer 910 may emit at a green wavelength, and the background OLED layer 910 may emit at a blue wavelength. It will be appreciated that various combinations of the background OLED layers 910, 912, 914 may be used to produce additional colors. For example, the light assembly 162j may be operable to produce each of the colors for the background portion 108a-108f shown in FIG. 2. It will also be appreciated that additional pattern layers may be provided to produce the various patterns illustrated in FIG. 3.

It may be noted that layers emitting longer wavelengths should be layered lower in the stack, whereas those with shorter wavelengths layered closer to the upper surface, since shorter wavelengths are typically more highly attenuated.

To enable each of the pattern OLED layers 906 and 908 to be highly visible, the intensity of these layers may be relatively higher than the intensity of any background layers 910, 912, 914. Also, the intensity of any of the layers in the notification light 106 may be made adjustable to optimize the intensity of each layer.

It will be appreciated that the anode and cathode of each of the OLED layers through which light passes should be substantially transparent. As such, in the example shown in FIG. 23, at least background layers 910 and 912 should be transparent.

It will also be appreciated that although not shown in the figures, a notification light may comprise a lens, a diffuser, or other optical feature on the notification light to direct light.

It will also be appreciated that in any of the above embodiments, any one or more of the LEDs or OLEDs may be intermittently illuminated. For example, the LEDs or OLEDs may blink or flash to indicate that a predetermined event has been detected. Such operations may be controlled by the light controller 160 according to the type of event of which it has been notified by, for example, an application 152.

Figure 24:
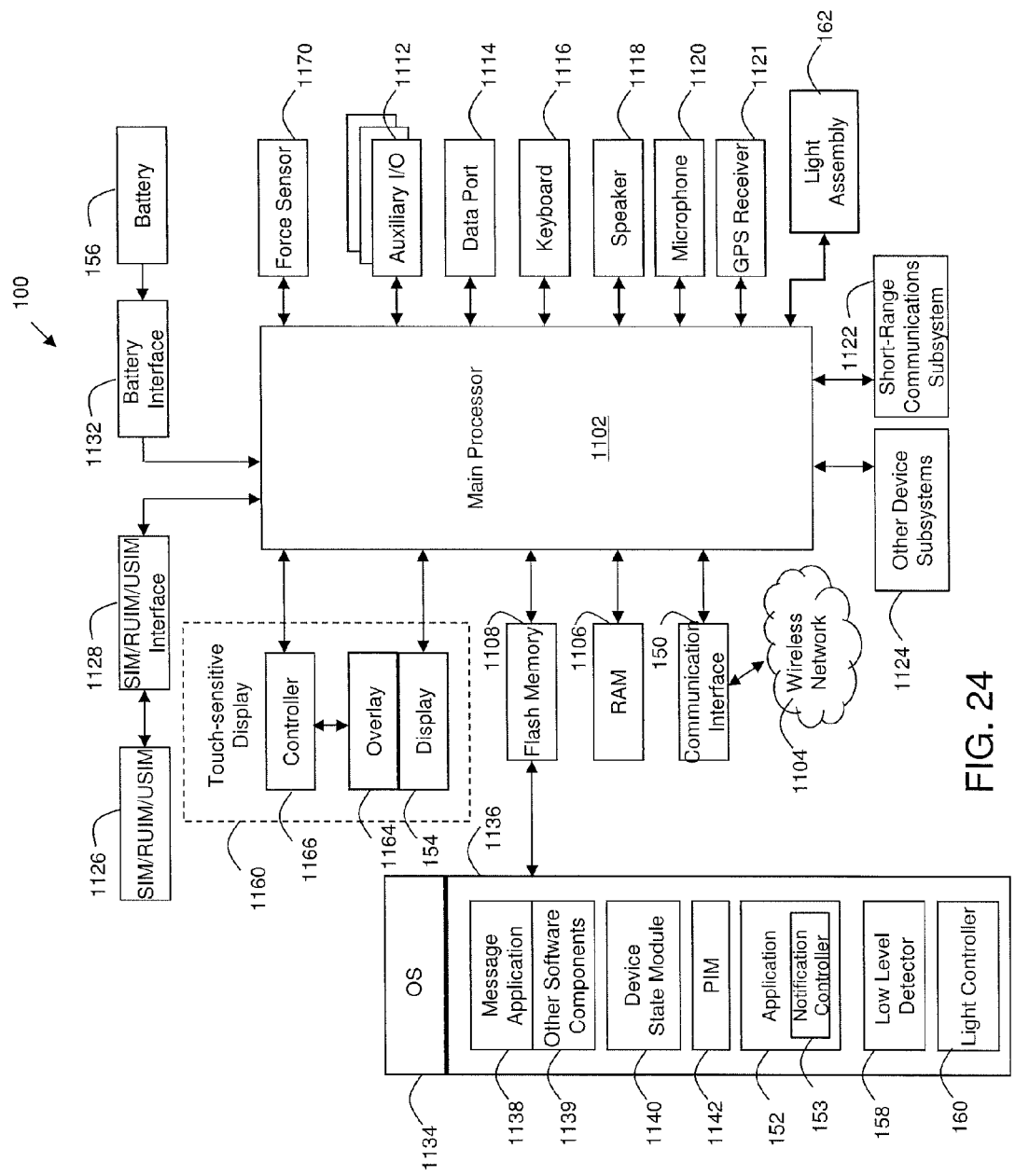
FIG. 24 is a block diagram of an example of a configuration for a mobile electronic device.

Referring to FIG. 24, to further aid in the understanding of the example mobile devices 100 described above, shown therein is a block diagram of an example configuration therefore. The mobile device 10 includes a number of components such as a main processor 1102 that controls the overall operation of the mobile device 100. Communication functions, including data and voice communications, are performed through a communication interface 150. The communication interface 150 receives messages from and sends messages to a wireless network 1104. In this example of the mobile device 100, the communication interface 150 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 150 with the wireless network 1104 represents one or more different Radio Frequency (RF) channels, operating according to defined protocols specified for GSM/GPRS communications.

The main processor 1102 also interacts with additional subsystems such as a Random Access Memory (RAM) 1106, a flash memory 1108, a touch-sensitive display 1160, an auxiliary input/output (I/O) subsystem 1112, a data port 1114, a keyboard 1116 (physical, virtual, or both), a speaker 1118, a microphone 1120, a GPS receiver 1121, a light assembly 162, short-range communications subsystem 1122, and other device subsystems 1124. Some of the subsystems of the mobile device 100 perform communication-related functions, whereas other subsystems may provide "resident" or on-device functions. By way of example, the touch-sensitive display 1160 and the keyboard 1116 may be used for both communication-related functions, such as entering a text message for transmission over the wireless network 1104, and device-resident functions such as a calculator or task list. In one example, the mobile device 100 can include a non-touch-sensitive display in place of, or in addition to the touch-sensitive display 1160. For example the touch-sensitive display 1160 can be replaced by a displayer 66 that may not have touch-sensitive capabilities.

The mobile device 100 can send and receive communication signals over the wireless network 1104 after required network registration or activation procedures have been completed. Network access is associated with a subscriber or user of the mobile device 100. To identify a subscriber, the mobile device 100 may use a subscriber module component or "smart card" 1126, such as a Subscriber Identity Module (SIM), a Removable User Identity Module (RUIM) and a Universal Subscriber Identity Module (USIM). In the example shown, a SIM/RUIM/USIM 1126 is to be inserted into a SIM/RUIM/USIM interface 1128 in order to communicate with a network.

The mobile device 100 is typically a battery-powered device and includes a battery interface 1132 for receiving one or more rechargeable batteries 1130. In at least some examples, the battery 156 can be a smart battery with an embedded microprocessor. The battery interface 1132 is coupled to a regulator (not shown), which assists the battery 156 in providing power to the mobile device 100. Although current technology makes use of a battery, future technologies such as micro fuel cells may provide the power to the mobile device 100.

The mobile device 100 also includes an operating system 1134 and software components 1136 to 1142, 152, 153, 158, and 160. The operating system 1134 and the software components 1136 to 1142, 152, 153, 158, and 160, that are executed by the main processor 1102 are typically stored in a persistent store such as the flash memory 1108, which may alternatively be a read-only memory (ROM) or similar storage element (not shown). Those skilled in the art will appreciate that portions of the operating system 1134 and the software components 1136 to 1142, 152, 153, 158, and 160, such as specific device applications, or parts thereof, may be temporarily loaded into a volatile store such as the RAM 1106. Other software components can also be included, as is well known to those skilled in the art.

The subset of software applications 1136 that control basic device operations, including data and voice communication applications, may be installed on the mobile device 100 during its manufacture. Software applications may include a message application 1138, a device state module 1140, a Personal Information Manager (PIM) 1142, an application 152, a notification controller 153, a low level detector 158, and a light controller 160. A message application 1138 can be any suitable software program that allows a user of the mobile device 100 to send and receive electronic messages, wherein messages are typically stored in the flash memory 1108 of the mobile device 100. A device state module 1140 provides persistence, i.e. the device state module 1140 ensures that important device data is stored in persistent memory, such as the flash memory 1108, so that the data is not lost when the mobile device 100 is turned off or loses power. A PIM 1142 includes functionality for organizing and managing data items of interest to the user, such as, but not limited to, e-mail, contacts, calendar events, and voice mails, and may interact with the wireless network 1104.

Other types of software applications or components 1139 can also be installed on the mobile device 100. These software applications 1139 can be pre-installed applications (i.e. other than message application 1138) or third party applications, which are added after the manufacture of the mobile device 100. Examples of third party applications include games, calculators, utilities, etc.

The additional applications 1139 can be loaded onto the mobile device 100 through at least one of the wireless network 1104, the auxiliary I/O subsystem 1112, the data port 1114, the short-range communications subsystem 1122, or any other suitable device subsystem 1124.

The data port 1114 can be any suitable port that enables data communication between the mobile device 100 and another computing device. The data port 1114 can be a serial or a parallel port. In some instances, the data port 1114 can be a Universal Serial Bus (USB) port that includes data lines for data transfer and a supply line that can provide a charging current to charge the battery 1130 of the mobile device 100.

For voice communications, received signals are output to the speaker 1118, and signals for transmission are generated by the microphone 1120. Although voice or audio signal output is accomplished primarily through the speaker 1118, the display 154 can also be used to provide additional information such as the identity of a calling party, duration of a voice call, or other voice call related information.

The touch-sensitive display 1160 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 1160 is a capacitive touch-sensitive display which includes a capacitive touch-sensitive overlay 1164. The overlay 1164 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 154 of the touch-sensitive display 1160 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 1160. The processor 1102 may determine attributes of the touch, including a location of a touch. Touch location data may include an area of contact or a single point of contact, such as a point at or near a center of the area of contact, known as the centroid. A signal is provided to the controller 1166 in response to detection of a touch. A touch may be detected from any suitable object, such as a finger, thumb, appendage, or other items, for example, a stylus, pen, or other pointer, depending on the nature of the touch-sensitive display 1160. The location of the touch moves as the detected object moves during a touch. One or both of the controller 1166 and the processor 1102 may detect a touch by any suitable contact member on the touch-sensitive display 1160. Similarly, multiple simultaneous touches, are detected.

In some examples, an optional force sensor 1170 or force sensors is disposed in any suitable location, for example, between the touch-sensitive display 1160 and a back of the mobile device 100 to detect a force imparted by a touch on the touch-sensitive display 1160. The force sensor 1170 may be a force-sensitive resistor, strain gauge, piezoelectric or piezoresistive device, pressure sensor, or other suitable device.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 14, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A light assembly for providing a notification light on an electronic device, the light assembly comprising:
   a first light source for providing a background portion for the notification light emitted at a front surface of a light assembly;
   a second light source, behind the first light source, for providing a patterned portion for the notification light emitted at the front surface of the light assembly; and
   at least one pattern element in a layer disposed between the first light source and the second light source, to generate the patterned portion; and
   wherein the first and second light sources are provided by light emitting diodes and corresponding waveguides to direct light through the light assembly, and wherein the pattern element is provided in an interface between the corresponding waveguides to restrict light from the second light source emitting to the front surface of the light assembly other than through a predetermined pattern in the pattern element in generating the patterned portion; and
   further comprising an optical diffuser comprising a concave portion of the waveguide of the first light source to direct and diffuse incident light received at the concave portion of the waveguide of the first light source from the second light source.

2. The light assembly of claim 1, further comprising a light controller for selectively operating the first light source and the second light source.

3. The light assembly of claim 1, wherein the corresponding waveguides are located one in front of the other, and wherein the first and second light sources are side emitting light emitting diodes that emit light directly toward a side of their corresponding waveguide other than toward a front side or toward a back side thereof.

4. The light assembly of claim 1, wherein the corresponding waveguides are located one in front of the other, and wherein the first light source is a side emitting light emitting diode that emits light directed toward a side of its corresponding waveguide other than a front side or a back side thereof, and the second light source is a front emitting light emitting diode that emits light directed toward a front side of its corresponding waveguide.

5. The light assembly of claim 1, wherein the first and second light sources are provided by light emitting diodes directing light through a single waveguide, the first light source being a side emitting light emitting diode that emits light directed toward a side of the single waveguide other than a front side or a back side thereof and the second light source being a front emitting light emitting diode that emits light incident to the back side of the single waveguide and directed toward a front side of the single waveguide.

6. The light assembly of claim 5, wherein the single waveguide comprises a convex portion at the back side of the single waveguide and in front of and aligned with the second light source to direct incident light received at the convex portion of the waveguide from the second light source in a direction substantially normal to the front side of the single waveguide.

7. The light assembly of claim 5, wherein the concave portion is aligned with the second light source.

8. The light assembly of claim 5, wherein the second light source is aligned with the pattern element and the pattern element restricts light from the second light source to generate the patterned portion of the notification light.

9. A light assembly for providing a notification light on an electronic device, the light assembly comprising:
   a first light source for providing a background portion for the notification light emitted at a front surface of a light assembly;
   a second light source for providing a patterned portion for the notification light emitted at the front surface of the light assembly; and
   at least one pattern element to generate the patterned portion, comprising a plurality of pattern elements one located in front of another on respective stacked organic light emitting diode layers, wherein the second light source selectively illuminates at least one of the plurality of pattern elements to provide the patterned portion of the notification light.

10. The light assembly of claim 9, wherein the first light source is provided by at least one background organic light emitting diode layer located beneath the plurality of respective organic light emitting diode layers for the plurality of pattern elements.

11. The light assembly of claim 10, wherein the at least one background organic light emitting diode layer comprises a plurality of background organic light emitting diode layers located beneath the plurality of respective organic light emitting diode layers for the plurality of pattern elements.

12. The light assembly of claim 10, wherein the plurality of background organic light emitting diode layers comprises
   a first background organic light emitting diode layer of a first color, and
   a second background organic light emitting diode layer of a second color, the second color being different from the first color, and located beneath the first background organic light emitting diode layer and the plurality of respective organic light emitting diode layers for the plurality of pattern elements, the first and second background organic light emitting diode layers being individually selectable to emit at the front surface of the light assembly a background portion for the notification light of any of the first color, the second color, or a combination of the first color and the second color.

13. A light assembly for providing a notification light on an electronic device, the light assembly comprising:
   a first light source for providing a background portion for the notification light emitted at a front surface of the light assembly;
   a second light source for providing a patterned portion for the notification light emitted at a front surface of the light assembly, the second light source comprising a first organic light emitting diode layer and a first pattern element;
   a third light source for providing the patterned portion for the notification light emitted at the front surface of the light assembly, the third light source comprising a second organic light emitting diode layer and a second pattern element, the first and second organic light emitting diode layers being stacked with the first and second pattern elements being located one in front of the other; and
   wherein at least one of the second and third light sources selectively illuminates respective at least one of the first and second pattern elements to provide the patterned portion of the notification light.

14. The light assembly of claim 13, wherein both the second and third light sources selectively illuminate respective first and second pattern elements to provide the patterned portion of the notification light.

* * * * *